United States Patent [19]
Compton

[11] Patent Number: 6,152,675
[45] Date of Patent: Nov. 28, 2000

[54] FOLD-UP HOIST FOR VEHICLE RECEIVER

[76] Inventor: Mark Compton, 1818 Taurus Dr., Nampa, Id. 83651

[21] Appl. No.: 09/374,084

[22] Filed: Aug. 12, 1999

[51] Int. Cl.$^7$ ....................................................... B60P 1/00
[52] U.S. Cl. .......................... 414/543; 414/462; 224/403; 212/299
[58] Field of Search .................................... 414/462, 543; 224/403; 212/294, 295, 299; 254/4 R, 4 B, 4 C

[56] References Cited

U.S. PATENT DOCUMENTS

| | | | |
|---|---|---|---|
| 3,854,594 | 12/1974 | Brookes | 212/299 |
| 4,746,263 | 5/1988 | Cook | 414/543 |
| 4,881,864 | 11/1989 | Amato | 414/543 |
| 5,752,799 | 5/1998 | Carey et al. | 414/462 X |
| 5,791,858 | 8/1998 | Sasser | 414/462 |

*Primary Examiner*—Frank E. Werner
*Attorney, Agent, or Firm*—Ken J. Pedersen; Barbara S. Pedersen

[57] ABSTRACT

This apparatus relates to a portable, fold-up hoist for attachment to a vehicle via a receiver hitch. The hoist has a tongue member for insertion into and securement by the hitch. Pivotally connected to the tongue member is a telescoping vertical support member. On the upper end of the vertical support member is a boom arm, which is both pivotally and swivelably connected to the vertical support member. Thus, the boom arm may be supported perpendicular to the vertical member and swivel around the vertical support member, for example, to move directly above the tongue and to move to be parallel but opposing the tongue. The boom arm may pivot down to be near and generally parallel to the vertical support member for storage. The vertical support member is pivotal on its proximal end from a first (storage) position generally parallel to the tongue member to a second (use) position generally perpendicular to the tongue member. A winch at various positions on the hoist, for example, and pulleys may be provided on the tongue, vertical support member or the horizontal boom arm for receiving a cable or line.

6 Claims, 4 Drawing Sheets

FOLD-UP HOIST FOR VEHICLE RECEIVER

BACKGROUND OF THE INVENTION

1. Field of the Invention

This invention relates generally to mobile cranes or hoists. More specifically, this invention relates to a fold-up hoist with a winch and a set of pulleys, the hoist being for a vehicle receiver hitch.

2. Related Art

There have been several mobile hoists proposed for attachment to the back of vehicles.

U.S. Pat. No. 4,806,063 (York) discloses a portable wild game hoist with an angled boom adapted to be supported by the ball of a trailer hitch. Straps are attached at one end to the boom and are attached at the other end to the fenders of the vehicle, and, thus, help to steady the boom.

U.S. Pat. No. 5,540,537 (Welch) discloses a portable hoist with a long, curved post connectable to a receiver hitch by means of a tongue that slides into the hitch. The post is rotatable from a horizontal position to a vertical position and is supported in the desired vertical position by a securing member extends from the top of the post to the tongue of the hoist.

U.S. Pat. No. 5,791,858 (Sasser) discloses a vehicle-mounted game skinning device with a vertical support unit connectable to a receiver hitch. The vertical support member slidably receives a vertical column member which in turn slidably receives a boom arm member. The boom arm supports a pulley connectable to an intermediate pulley and a winch on the vertical support member.

Still, there is a need for a compact, versatile fold-up hoist for vehicle receiver hitches. This invention addresses that need.

SUMMARY OF THE INVENTION

The present invention is a portable, fold-up hoist for attachment to a vehicle via a receiver hitch. The hoist has a tongue member for insertion into and securement by the hitch. Pivotally connected to the tongue member is a telescoping vertical support member. The vertical support member is pivotal at its proximal end from a first (storage) position generally parallel to the tongue member to a second (use) position generally perpendicular to the tongue member.

On its distal end, the vertical support member has a swivel joint which receives a horizontal boom arm. The boom arm may swivel in a generally horizontal plane when in the "use" position to move preferably 360° around the vertical support member. Also, the boom arm is pivotal on its proximal end from a first (storage) position generally parallel to the vertical support member to a second (use) position generally perpendicular to the vertical support member.

A winch or winches may be provided preferably either on the tongue member or the vertical support member, or at some nearby position. Also, pulleys may be provided on the tongue member, vertical support member, and/or the horizontal boom arm for receiving a cable or line from the winch.

Thus, a portable hoist for attachment to the receiver hitch of a vehicle is provided, which hoist may be folded up from its operational "Z" configuration to a thin, flat, elongated configuration when not in use. The portable hoist may be extended in height and may be swung 360 degrees around its vertical axis, for efficiently reaching, lifting, and relocating wild game or other heavy or bulky objects.

DESCRIPTION OF THE PREFERRED EMBODIMENTS

Figure 1:
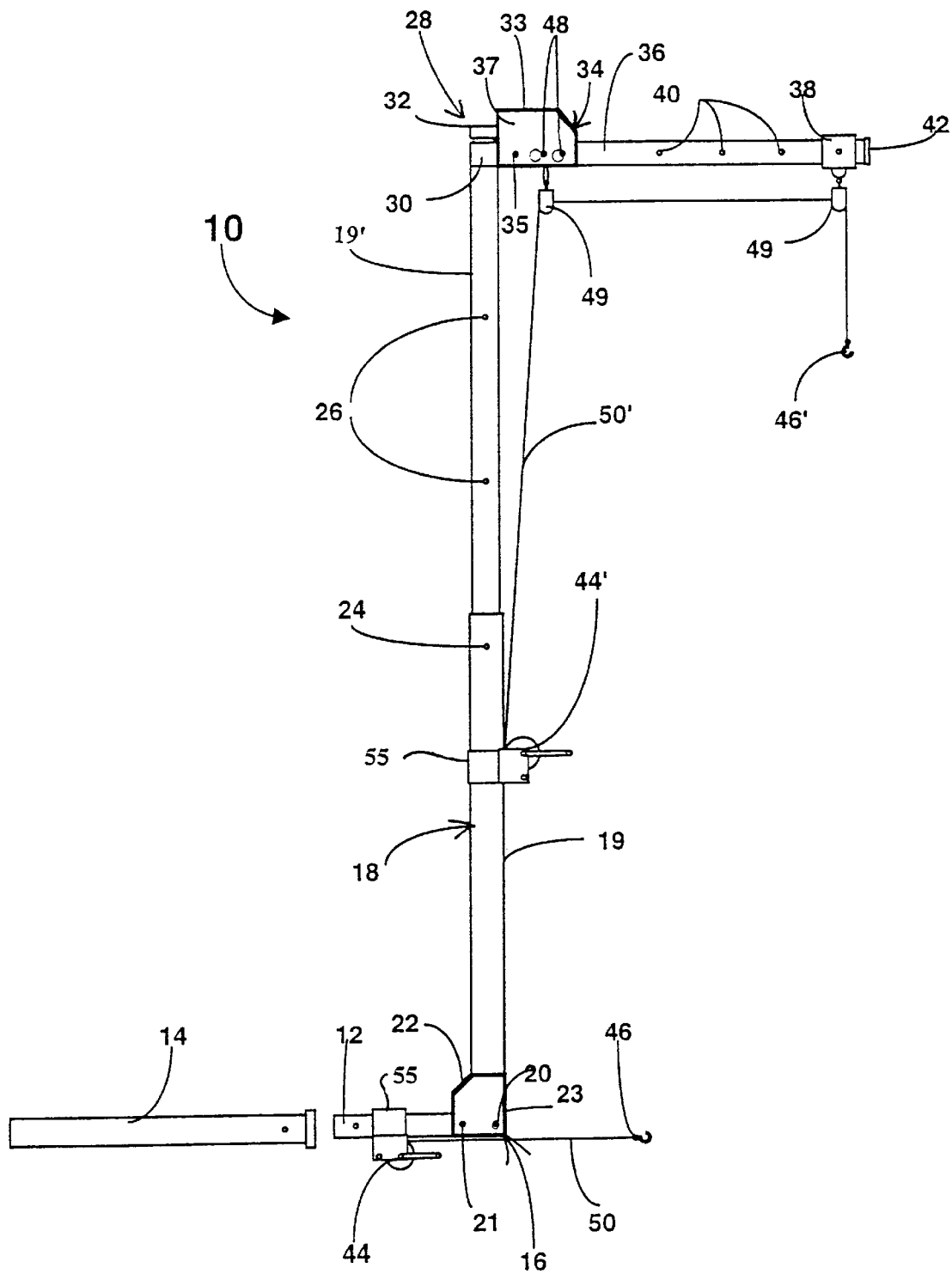
FIG. 1 is a side schematic view of one embodiment of the present hoist invention with the vertical support member and boom arm in a use position.

Referring to FIG. 1, there is depicted an embodiment 10 of the hoist of the present invention. Hoist 10 has tongue member 12 for attachment to a vehicle (not shown) via receiver hitch 14. In the following description, the term "proximal" refers to ends or positions nearer the vehicle, that is, nearer left and/or bottom edges of the sheet in FIG. 1. The term "distal" refers to ends or positions away from the vehicle, that is, nearer the right and/or top edges of the sheet in FIG. 1.

Proximal end of tongue 12 may be received by and secured within hitch 14 in the conventional manner. Therefore, tongue 12 on its proximal end and hitch 14 may be of conventional construction.

Figure 2:
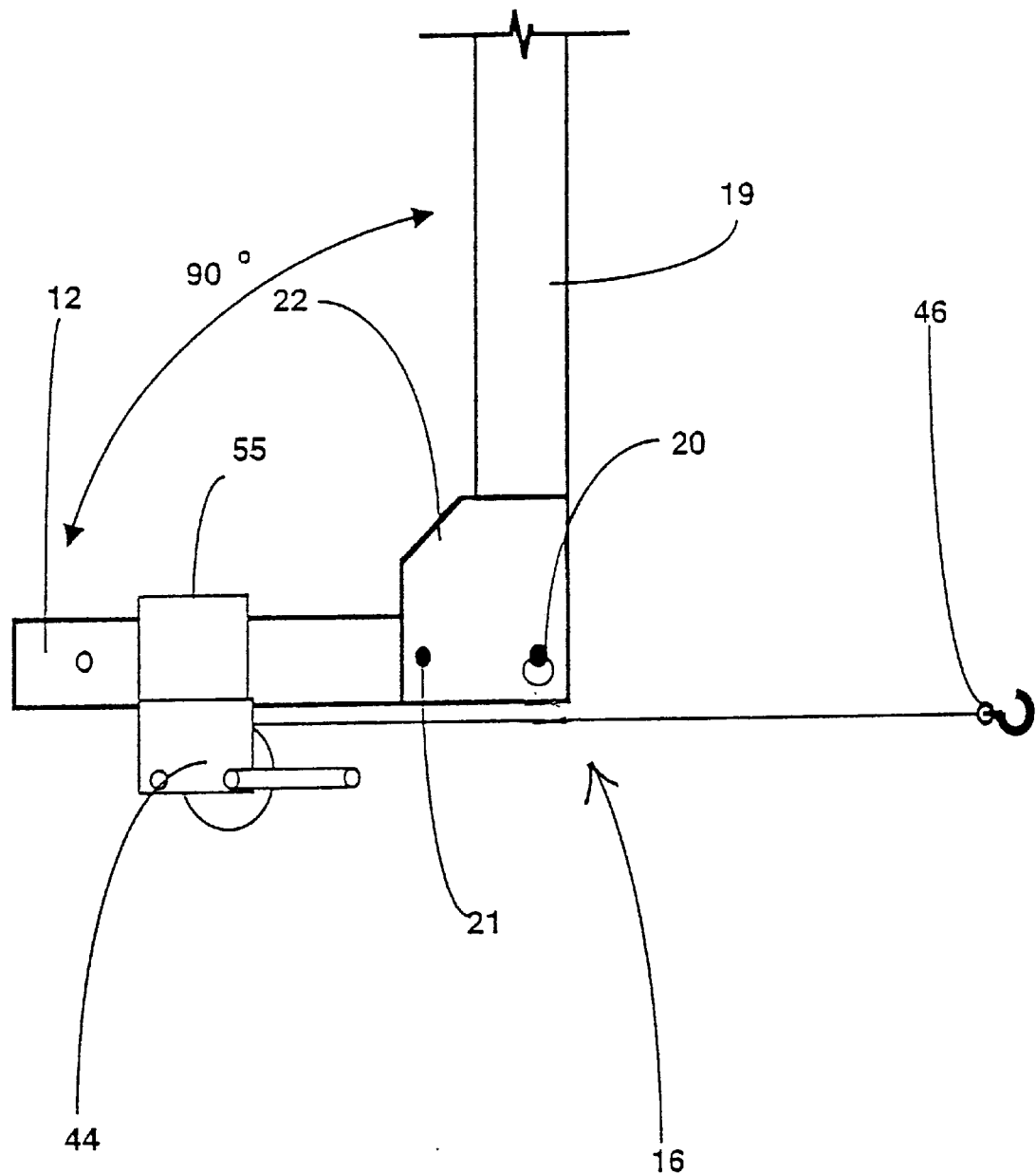
FIG. 2 is a side detail view of one embodiment of a pivotal joint between the vertical support arm and the tongue member of FIG. 1.

At or near its distal end, tongue 12 connects to vertical support member 18 at first pivotal connection 16, also referred to as the first "joint," as illustrated in FIG. 1 and in detail in FIG. 2. Vertical member 18 has one or more telescoping sections 19' which telescope into main portion 19. Preferably, first pivotal connection 16 includes a bracket 23 with one or more side braces 22 and a pivot axle 21 on which tongue 12 pivots relative to vertical member 18 and relative to the bracket 23. Lock pin 20 extends through tongue 12, side braces of the bracket 23, and vertical member 18. Pin 20 is removable and reinsertable to unlock and unlock the joint respectively. Side braces 22 are for stabilizing vertical member 18 relative to tongue 12. This way, the first joint (connection 16) may be used to rotate tongue 12 and vertical member 18 relative to each other. In the preferred connection 16 shown in FIG. 1, tongue 12 may rotate relative to the bracket 23 and vertical member 18 to 1) lie in side-by side fashion parallel to vertical member 18 in a first storage position or 2) to extend generally perpendicularly to vertical member 18 for securement by pin 20 in a second use position. Tongue 12 and member 18 are sized and positioned to cooperate within bracket 23 and pin 20 so that the connection 16 is easily pivotal, when desired, for easy placement of the hoist into the "collapsed" storage position, and so that the connection 16 also may be made rigid and unmovable, when desired, for safe hoisting.

Alternatively, the first pivotal connection may be made so that the vertical member 18 rotates relative to the bracket 23 and the tongue 12, for example. Those skilled in the art will recognize that several alternative pivotal connections may be constructed to accomplish to desired goals.

Figure 4:
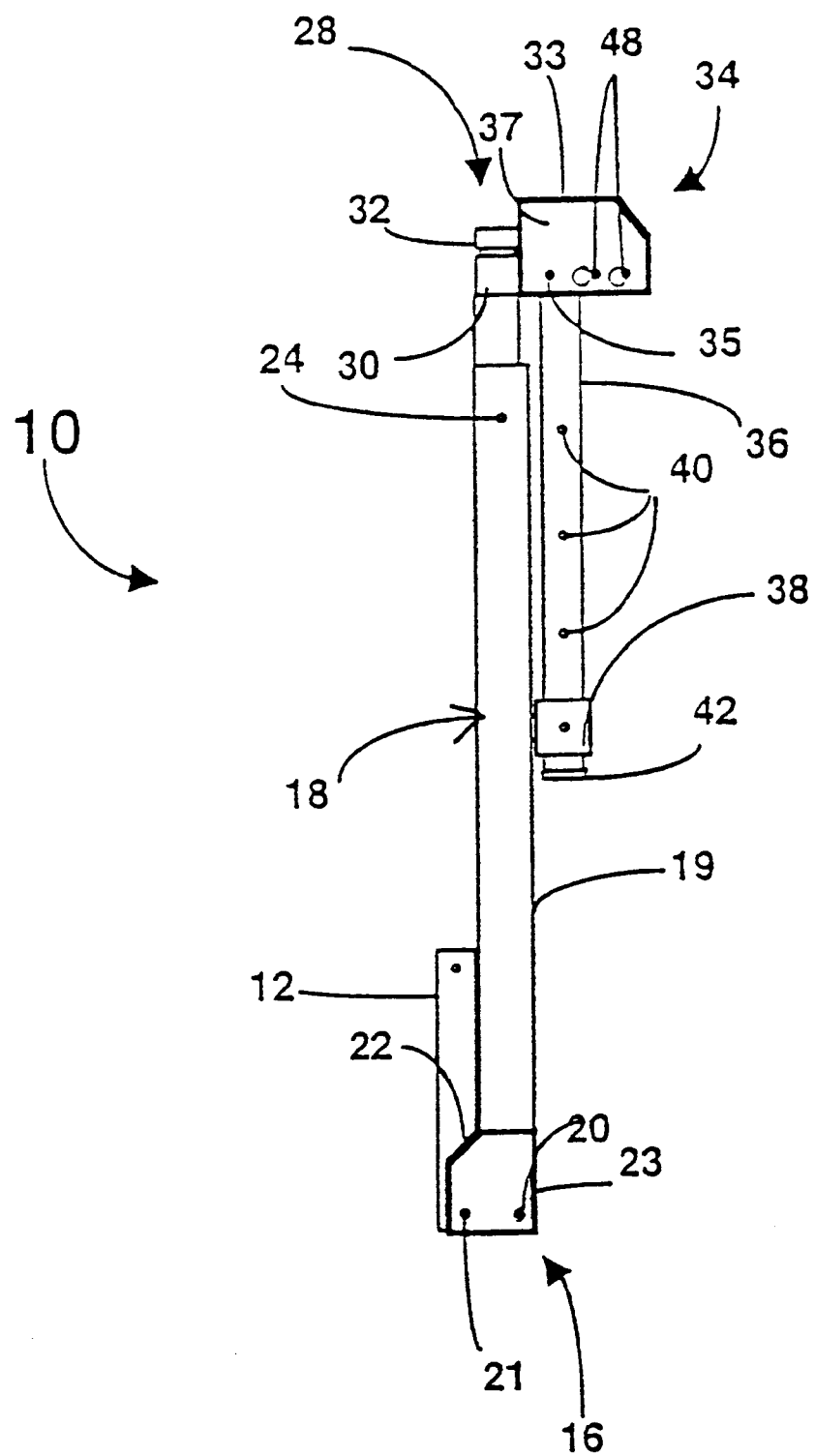
FIG. 4 is a side view of the hoist embodiment of FIGS. 1–3, folding into a storage position.

Telescoping portion 19' of vertical support member 18 may be extended out from the main portion 19 and secured there by an extender pin 24, which extends through a hole in main portion 19. Telescoping portion 19' may have several support holes 26 therethrough at several locations along its length for receiving pin 24. This way, the effective length of vertical member may be adjustably increased. Also, telescoping portion 19' may be pushed into main portion to decrease the overall length of hoist 10 for storage, as shown in FIG. 4.

Figure 3A:
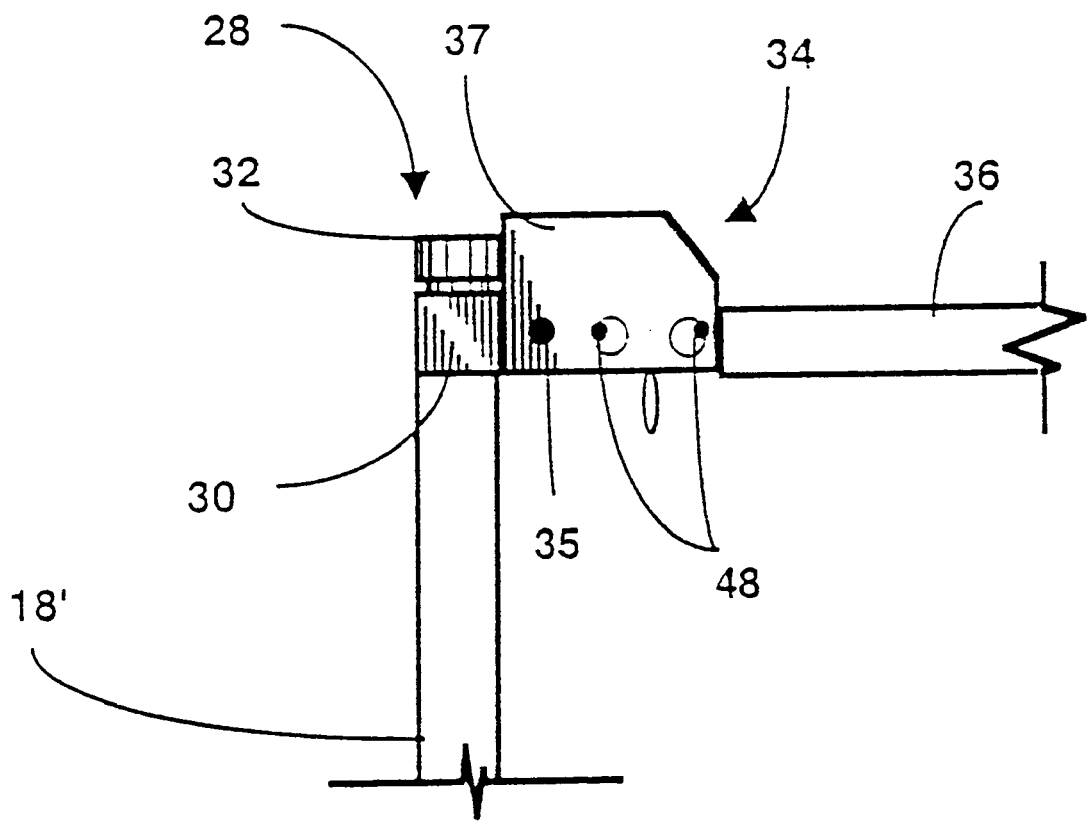
FIG. 3A is a side detail view of embodiments of a swivel joint and a pivotal joint between the vertical support arm and the boom arm of FIG. 1.
Figure 3B:
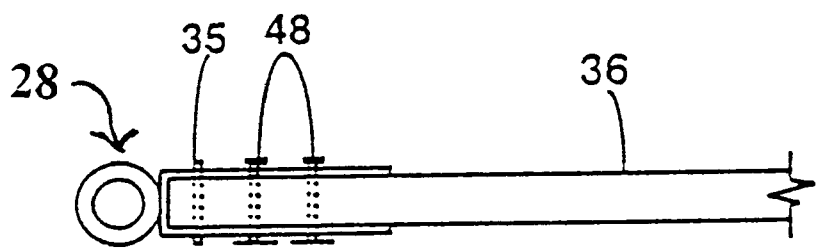
FIG. 3B is a top view of the swivel joint and pivotal joint of FIG. 3A.

On its distal end, vertical support member 18 is preferably connected to the boom arm 36 by both a swiveling connection and a pivoting connection. These connections are illustrated in FIG. 1 and in detail in FIGS. 3A and 3B.

The swiveling connection is preferably a 360° swivel joint 28, but, alternatively, joints that swivel in the range of preferably 180–360° may also be effective. Preferably, swivel joint 28 has a support collar 30 which surrounds the top of telescoping portion 19', and a rotating circular support cap 32 which is received and supported by support collar 30 and which swivels 360° relative to collar 30.

Horizontal boom arm 36 is preferably pivotally connected to the swivel joint via second pivotal connection 34, also referred to as the "second joint". The connection 34 may be attached to cap 32 so that both connection 34 and horizontal boom arm 36 swivel around the vertical axis formed by vertical member 18. Preferably, second pivotal connection 34 includes a bracket 33 with one or more side braces 37 and pivot axle 35 which extends through side braces 37 and 30 boom arm 36. Side braces 37 are for stabilizing horizontal boom arm 36 relative to vertical support member 18, that is, specifically telescoping portion 18'.

Second pivotal connection 34 may be used to rotate boom arm 36 and vertical support member 18 relative to each other. In the preferred connection 34 shown in FIG. 1, boom arm 36 may rotate relative to the bracket 33 and vertical member 18 to 1) lie in side-by side fashion parallel to vertical member 18 in a first storage position or 2) to extend generally perpendicularly out from vertical member 18 for securement boom lock pin(s) 48 in a generally horizontal second use position. Boom arm 36 is sized and positioned to cooperate with bracket 23 and pins 48 so that the connection 34 is easily pivotal, when desired, for easy placement of the hoist into the "collapsed" storage position, and so that the connection 34 also may be made rigid and unmovable, when desired, for safe hoisting. Those skilled in the art will recognize that several alternative second pivotal connections may be constructed to accomplish the desired goals.

Boom arm 36 preferably carries boom collar 38 which may be slid along boom arm 36 and secured to it at several boom holes 40 located along the length of boom arm 36. The collar 38 may be used to optimize placement of the outermost pulley 49 relative to the load to be hoisted and relative to the truck bed or other platform onto which the load is to be hoisted. Boom arm 36 also has optional boom cap 42 at its distal end to prevent boom collar 38 from sliding off.

The preferred system for supplying lifting and/or pulling force is a winch and pulley system, as illustrated by the embodiment in FIG. 1. A preferably removable winch 44 may be provided on the tongue 12, for example, for providing a pulling force in a generally horizontal direction. Such a horizontal force may be used, for example, for pulling game with cable 50 and hook 46 up a hillside or across brushy terrain towards the tongue 12. A preferably removable winch 44' may be provided on vertical support member 18 to provide a substantially vertical force for hoisting game with cable 50' and hook 46'. Pulleys 49 may be provided at various locations on the tongue 12, support 18, and arm 36, as deemed appropriate, with the preferred two pulleys being located on boom arm 36 to receive a cable or line from winch 44'. In FIG. 1, hoist 10 is shown with cable 50' extending up from winch 44' to a pulley 49 near the second pivotal connection 34 and then extending generally horizontally to a pulley 49 hanging from the boom collar 38. Other combinations of winch and pulley locations may be found to be useful.

In use, the tongue 12 is slid and secured into hitch 14. The hoist is pivoted at first joint 30 (at connector 16) to move vertical member 18 relative to tongue 12 in the "plane of the hoist" (the plane of the paper sheet of FIG. 1) to a perpendicular relationship. Lock pin 20 is inserted to fix the relationship of tongue and member 18. Boom arm 36 is pivoted to be perpendicular to the vertical member 18 and locked in place with lock pin(s) 48. Telescoping portion 18 may be extended and collar 38 may be positioned to receive cable in a desired direction and at a desired distance from the vertical member 18. Then, the winch systems may be used to pull an object, such as wild game or agricultural stock, horizontally closer to the hitch 14 and/or up from the ground to near the boom arm 36. Swivel joint 28 allows boom arm 36 and its cargo to swivel out of the plane of the hoist around the vertical member 18, for example, to move game into a pickup truck bed (not shown). The swivel joint may also be used to properly position the boom arm and cable 50' and hook 46' pointing directly at the game or load to be pulled and lifted. For example, if a pick-up truck may only be driven to a position perpendicular to the direction in which the game lies, the boom arm 36 may be swivelled perpendicular to the truck bed to point directly at the game. Then, when the cable 50' is connected to the game by means of a chain or strap and is pulled by winch 44', the cable remains substantially in a single vertical plane for more efficient and successful pulling.

After use, as shown in FIG. 4, the hoist 10 may be "collapsed" into a generally flat and is thin unit. The collapsed unit has a width of approximately the sum of the widths of the tongue 12, the vertical member 18, and the boom arm, so that it may be easily stored, for example, along-side a truck bed load, or in a corner of a storage closet or building.

Thus, with the invented hoist 10, wild game or other objects may easily be lifted or pulled and maneuvered, for example, into and off of a truck bed. The swivel joint 28 allows 360° maneuvering, the collar 38 allows and winch 44 allows horizontal maneuvering; the winch 44' and pulley 49 system allow vertical maneuvering; and the telescoping feature of vertical member 18 allows lifting to various heights above the elevation of the hitch 14.

The hoist 10 may be made of various strong materials, preferably steel. The various joints, that is, first and second pivoting joints and the swivel joint, may be made according to 25 conventional art. The swivel joint may include, for example, a greased brushing or a seal bearing. The winches 44, 44' may be installed by attaching each manual winch to a unshaped bracket 55 that slides around the vertical member 18 and/or the tongue 12 and is locked in place by lock pins, stops or other fasteners. Systems may be provided to adjust the location of the winch 44' along the length of the vertical member 18, but preferably the winch 44' is about ⅓–½ of the way up the member 18. Pulleys 49 and winches 44, 44' may be removable, as suggested by FIG. 4, to allow more compact folding and storage. Alternatively, but less preferably, automatic winches or cables and pulleys without winches may be supplied.

Although this invention has been described above with reference to particular means, materials and embodiments, it is to be understood that the invention is not limited to these disclosed particulars, but extends instead to all equivalents within the scope of the following claims.

I claim:

1. A portable, fold-up hoist for attachment to a vehicle via a receiver hitch, comprising:
   a. a tongue member with a proximal end and a distal end, said proximal end being for insertion into and securement by a vehicle hitch;
   b. a vertical support member with a proximal end and a distal end, said proximal end of said vertical support member being pivotally connected to said tongue member by a bracket, side brace and a pivot axle at said tongue member's distal end, and said vertical support member being securable by a pin to said tongue member to extend perpendicularly relative to said tongue member;
   c. a swivel joint located at said distal end of said vertical support member said swivel joint comprising a support collar which surrounds said distal end of said vertical support member, and a rotating cap received and supported by said support collar; and
   d. an elongated boom arm being pivotally connected to said rotating cap of said swivel joint, said boom arm being securable by a pin to said vertical support member to extend horizontally relative to said vertical support member.

2. The hoist of claim 1 wherein the vertical support member comprises a main, proximal section and one or more telescoping, distal sections which telescope into said main, proximal section.

3. The hoist of claim 1 wherein the boom arm has a length and the hoist further comprises a boom collar slidably connected on the boom arm so that said boom collar can slide along the length of the boom arm and receive cable at a desired distance from said vertical support member.

4. The hoist of claim 1 comprising a first winch connected to a bracket that surrounds the vertical support member, a pulley connected to the boom arm, and a cable connecting the winch and pulley.

5. The hoist of claim 1 comprising a second winch connected to a bracket that surrounds the tongue member.

6. The hoist of claim 1, wherein the swivel joint swivels 360 degrees.

* * * * *